United States Patent

Gryaznov et al.

[11] 3,779,711
[45] Dec. 18, 1973

[54] CATALYTIC REACTOR DESIGNED FOR CARRYING OUT CONJUGATE CHEMICAL REACTIONS

[76] Inventors: Vladimir Mikhailovich Gryaznov, Leninskie gory, zona, L., kv. 11; Alexandr Petrovich Mischenko, Khersonskaya ulitsa, 7, korpus 4, kv. 515; Viktor Sergeevich Smirnov, Kutuzovsky prospekt, 26, kv. 555; Sergei Ivanovich Aladyshev, ulitsa Grimau, 7/2, korpus 4, kv. 77, all of Moscow, U.S.S.R.

[22] Filed: July 19, 1971

[21] Appl. No.: 163,709

[52] U.S. Cl. ........ 23/288 R, 48/DIG. 5, 260/672 R, 260/680 R
[51] Int. Cl. ........ B01j 9/04, C07b 3/00, C07c 3/58
[58] Field of Search ...................... 23/288 R, 288 K, 23/288 L, 288 M, 289, 284, 285, 212 R, 1 R; 55/158, 16; 260/672 R, 673.5, 683.3, 690, 696; 48/DIG. 5

[56] References Cited
UNITED STATES PATENTS

| | | | |
|---|---|---|---|
| 3,210,162 | 10/1965 | Rudd | 23/285 |
| 3,562,346 | 2/1971 | Smirnov et al. | 260/683.3 X |
| 3,129,065 | 4/1964 | Korwin | 23/288 M X |
| 3,450,500 | 6/1969 | Setzer et al. | 23/288 R X |

*Primary Examiner*—Joseph Scovronek
*Attorney*—Holman & Stern

[57] ABSTRACT

A catalytic reactor for carrying out conjugate chemical reactions, comprising a housing, whose inner space is adapted for carrying out one of said conjugate reactions, and a system of thin-walled tubes designed for carrying out thereinside the other of said conjugate reactions and arranged freely inside the housing. The tubes are manufactured from a material that is selectively permeable to the common reactant of the conjugate reactions and catalytically active with respect to both conjugate reactions. The tubes are made fast in the reaction vessel lid which is provided with manifolds adapted for the introduction of the reactants and for the removal of the reaction products, the free ends of the tubes connected to the inlet manifold communicating with the free ends of the tubes connected to the outlet manifold.

2 Claims, 3 Drawing Figures

3,779,711

CATALYTIC REACTOR DESIGNED FOR CARRYING OUT CONJUGATE CHEMICAL REACTIONS

The present invention relates to chemical reactors and, more particularly, it relates to catalytic reactors designed for carrying out conjugate chemical reactions without mixing the starting materials of the processes being conjugated. The reactor disclosed in connection with the present invention can also be employed for preparing high-purity hydrogen from hydrocarbons.

There is known a catalytic reactor designed for carrying out conjugate chemical reactions, comprising a housing which accommodates thereinside a system of thin-walled tubes fixed on one end in the lid of the reactor and on the other end in the bottom of the reactor, so that the reactor is divided into two spaces. There may be introduced into one of these spaces, e.g., into the tubes, a substance subject to dehydrogenation.

Hydrogen, which is split upon dehydrogenation inside the tube, permeates through the tube wall and, on the outer surface of the tube, enters an addition reaction with hydrocarbon supplied to the inner space of the reactor. Thus, in the reactor is provided the conjugation of two reactions without mixing the reactants but solely due to the transfer of the reactant common to both reactions, namely, hydrogen, from one space of the reactor to the other.

However, said known catalytic reactor features a disadvantage in that mechanical stresses occur in the tube walls upon heating and cooling, which results in a premature wear and breakage of the thin-walled tubes. Another disadvantage of the known reactor resides in the short length of the catalytically active surface of the tubes, which results in a short contact time of the reactant with the surface of the tubes and, consequently, in a reduced yield of the target product.

The afore-listed disadvantages impair the reliability of operation of the catalytic reactor and have an adverse affect upon its technological characteristics.

It is an object of the present invention to provide a catalytic reactor designed for carrying out conjugate chemical reactions, wherein thin-walled tubes will not experience mechanical stresses in the course of heating and cooling, and wherein provision is made for an increased contact time of the reactants with the catalytically active surface of the tubes.

The foregoing object of the invention is attained due to the fact that in a catalytic reaction vessel designed for carrying out conjugate chemical reactions, according to the present invention, the tubes are made fast in the reactor lid provided with two manifolds one of which is adapted for the introduction of reactants and the other being adapted for the removal of the reaction products, part of the tubes being connected to one of the aforesaid manifolds and the other part of the tubes being connected to the other manifold, so that the tubes connected to the inlet manifold communicate with the tubes connected to the outlet manifold.

By so securing the tubes in the reactor, there is provided a free arrangement of one end of the tubes in the space of the reactor housing, which helps eliminate mechanical stresses occurring in the tube walls in the course of heating and cooling. In addition, at a tube length equal to that of the known reaction vessel, the path travelled by the reactant is practically doubled which results in an increased contact time of the reactant with the catalytic surface, thereby bringing about a greater yield of the target product per cycle of the reactant passage through the reaction vessel.

Presented hereinbelow is a detailed description of the preferred embodiments of the present invention, to be taken in conjunction with the accompanying drawings, in which.

Figure 1:
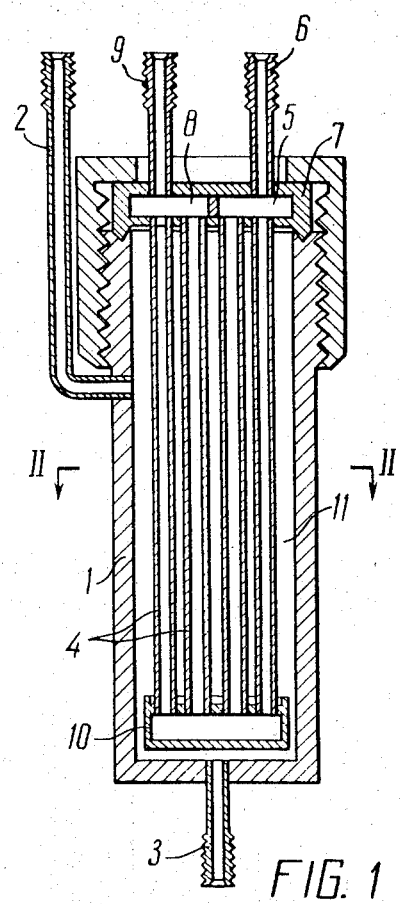
FIG. 1 is a cross-sectional view in elevation of the catalytic reaction vessel according to the present invention.
Figure 2:
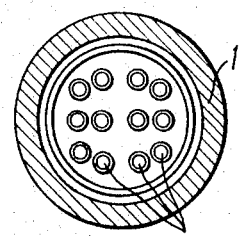
FIG. 2 is a section taken on the line II—II of FIG. 1.

Referring now to the drawings, the catalytic reactor according to the invention comprises in a housing 1 (see FIG. 1) connecting pipes 2 and 3 adapted for the delivery of reactants and removal of products, respectively, of a reaction carried out on the outside of thin-walled tubes 4 shown in FIGS. 1 and 2. Part of the tubes 4 are made fast with their one end in an inlet manifold 5 (FIG. 1) having a connecting pipe 6 and secured in a lid 7 of the reactor. The other part of the tubes 4 are made fast in an outlet manifold 8 having a connecting pipe 9. The manifold 8 is also secured in the lid 7 of the reactor.

The opposite ends of the tubes 4 communicate with each other with the aid of a manifold 10 adapted to provide for the flow of reactants from the tubes 4 connected to the manifold 5 over to the tubes 4 connected to the manifold 8. In order to seal the inner space of the tubes 4 from the reactor space 11, the tubes 4 are soldered or welded in the walls of the manifolds 5, 8 and 10.

Figure 3:
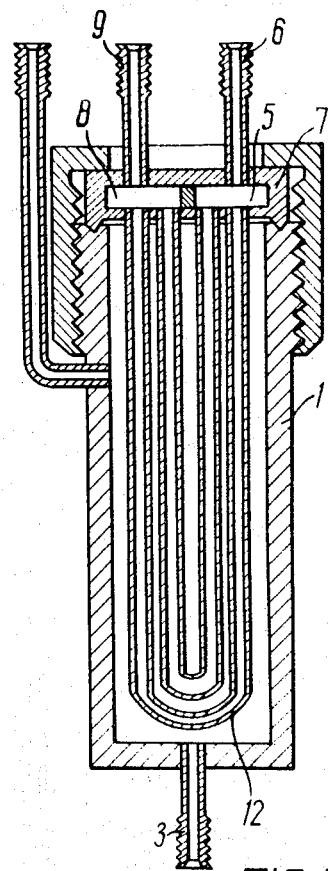
FIG. 3 is another embodiment of the catalytic reaction vessel according to the present invention.

The ends of the tubes 4 that are not secured in the manifolds 5 and 8 may communicate with each other directly, without the aid of the additional manifold 10. In this case, the thin-walled tubes connected to the manifold 5 and the tubes connected to the manifold 8 form integral continuous V-shaped tubes 12 (see FIG. 3).

For increasing the length of the thin-walled tubes, the latter can be coiled (not shown in the drawings).

The catalytic reactor designed for carrying out conjugate processes, disclosed in connection with the present invention, operates in the following manner:

The reactor is heated to a temperature required for carrying out the reactions being conjugated. Supplied by way of the connecting pipe 6 (see FIG. 1) to the inner space of the tubes 4 is a substance essential for carrying out one of the conjugate reactions, while to the connecting pipe 2 of the housing 1 is fed a substance required for carrying out the other of the conjugate reactions. The first substance comes into reaction on the catalytically active surface of the tubes 4 with the formation of the target product and of a component that is common to both of the conjugate reactions which dissolves in the material of the tubes 4 and permeates to their outer surface where the other substance is present. The common component having passed through the wall of the tubes 4 reacts with the other substance to form the second target product. The reaction products formed are removed from the tubes 4 via the connecting pipe 9, and from the space 11 of the reactor via the connecting pipe 3. It is possible to supply the first substance to the space 11 of the reactor, and the second substance to the inside the tubes 4.

The reactor disclosed herein can be employed, for example, for carrying out dehydrogenation and hydrodealkylation reactions. In this case, the thin-walled tubes 4 are manufactured from a palladium alloy, palladium being active in dehydrogenation and hydrodealkylation. Supplied via the connecting pipe 6 is, for example, isoamylene, and via the connecting pipe 2 is toluene.

Isoamylene enters the dehydrogenation reaction with separation of hydrogen and formation of isoprene. Hydrogen dissolves in the palladium alloy and permeates onto the outer surface of the tubes 4. Highly active atomic hydrogen having passed through the walls of the tubes 4 reacts with toluene and forms benzene and methane.

The isoprene formed is removed via the connecting pipe 9, and benzene is removed through the connecting pipe 3.

In the reactor according to the present invention, the tubes 4 have the possibility of freely elongating during heating without any mechanical stresses, thanks to the free arrangement of one end of said tubes in the housing 1. In addition, such a manner of securing the tubes 4 in the reaction vessel helps attain a practically twofold increase in the length of the tubes 4, as compared with the known reactor, and, consequently, prolongs the time of contact of a substnace passing through the tubes 4 with the surface of the latter.

What is claimed is:

1. Apparatus for simultaneously carrying out two reactions on opposite sides of a partition made from a catalytically active material permeable only to a substance formed on one side and consumed on the other side of said partition, which comprises a plurality of thin-walled tubes, half the total number of which are connected by one end to an inlet manifold, while the other half are connected to an outlet manifold, the opposite ends of all said tubes being interconnected through an intermediate manifold with the tubes being free to expand and contract at said opposite ends, the reactor housing being provided with inlet and outlet pipes for introducing the starting subtances and discharging the products of one reaction, while the products of the second reaction pass through said tubes and manifolds.

2. An apparatus as claimed in claim 1, wherein said thin-walled tubes are made from a palladium-based alloy.

* * * * *